United States Patent [19]

Friedland

[11] 4,132,482

[45] Jan. 2, 1979

[54] FEEDBACK SYSTEM FOR A RING LASER GYRO

[75] Inventor: Bernard Friedland, West Orange, N.J.

[73] Assignee: The Singer Company, Little Falls, N.J.

[21] Appl. No.: 832,053

[22] Filed: Sep. 12, 1977

[51] Int. Cl.² ........................ G01B 9/02; G06G 7/48
[52] U.S. Cl. .................................. 356/350; 364/118
[58] Field of Search ................ 356/106 LR; 364/118, 364/453, 434

[56] References Cited

U.S. PATENT DOCUMENTS

| | | | |
|---|---|---|---|
| 3,469,922 | 9/1969 | Coccoli et al. | 356/106 LR |
| 3,612,690 | 10/1971 | Staats | 356/106 LR |
| 3,721,497 | 3/1973 | Shutt et al. | 356/106 LR |
| 3,743,969 | 7/1973 | Hutchings | 356/106 LR |
| 3,846,025 | 11/1974 | Wilber | 356/106 LR |

*Primary Examiner*—Felix D. Gruber
*Attorney, Agent, or Firm*—Thomas W. Kennedy

[57] ABSTRACT

In a ring laser gyroscope the residual "lock-in" which normally remains with an open loop dither system is overcome through the use of a dynamic feedback system between the output of the ring laser gyro and the dither rate input.

12 Claims, 3 Drawing Figures

FEEDBACK SYSTEM FOR A RING LASER GYRO

BACKGROUND OF THE INVENTION

This invention relates to ring laser gyroscopes in general and more particularly to an improved system for eliminating lockin in a ring laser gyroscope.

Various types of ring laser gyroscope apparatus have been developed. Typical is the apparatus disclosed in U.S. Pat. No. 3,373,650. As explained therein, in a ring laser gyroscope, two monochromatic beams of light are generated in two opposite directions around a closed loop path about the axis of rotation. A rotation of the apparatus about that axis causes the effective path length for the two beams to change to produce a frequency difference between the two beams since the frequency of oscillation of a laser is dependent upon the length of a lasing path. It is possible, by combining the two waves, to generate interference patterns and from these patterns to obtain a measure of the rotational rate about the axis.

However, as explained in this patent, at low rotational rates, when the difference in frequency between the two beams is small, they tend to resonate together or lock-in and oscillate at only one frequency. As a result, low rotation rates become impossible to read. The device of U.S. Pat. No. 3,373,650, overcomes this problem by oscillating or dithering the apparatus so as to avoid lock-in of the two beams. A further apparatus of this nature is disclosed in U.S. Pat. No. 3,467,472. A detailed explanation of the problem and the various proposed solutions thereto, is contained in U.S. Pat. No. 3,879,130. The system disclosed therein takes a different approach to the problem using a saturable absorber internal to the ring laser cavity as a solution to this problem. The present invention relates basically to the type of solution proposed by U.S. Pat. Nos. 3,373,650 and 3,467,472, i.e., dithering. In all mechanical dithering systems to date, operation has been open loop. Although lock-in is avoided to a large degree, a certain amount of residual lock-in remains present and causes errors which are often unacceptably large. Similar problems occur when using optical dithering or some other type which has the same effect.

Thus, the need for a system which produces a dither in which the residual lock-in effect is absent or much smaller than in previous dither producing techniques, becomes evident.

SUMMARY OF THE INVENTION

The present invention overcomes this problem through the use of a dynamic feedback system between the output of the ring laser gyro and the dither-rate input. In general terms, it generates a dither signal which cancels the lock-in term.

The present invention is disclosed in terms of an analog implementation. However, it will become evident in the description that implementation could be digitally through the use of a micro computer or could be done with a combination of analog and digital hardware.

Furthermore, it is applicable to all types of dithering systems, e.g., mechanical, optical and any other system which achieves the same result as mechanical or optical dithering.

DETAILED DESCRIPTION OF THE INVENTION

Figure 1:
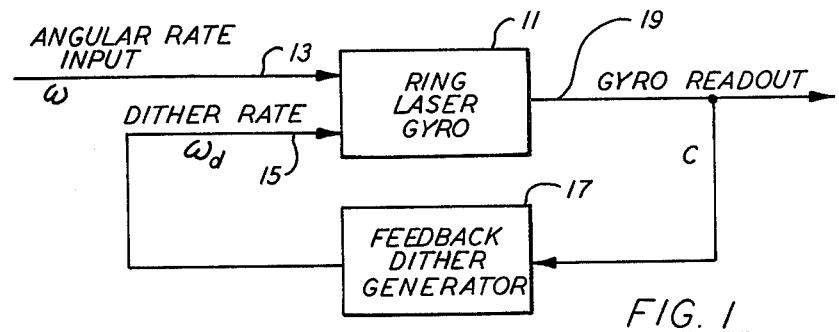
FIG. 1 is an over-all block diagram of the system of the present invention.

The general block diagram of the present invention is shown on FIG. 1. Shown is a block 11 representing the ring laser gyro. The ring laser gyro has two rotational inputs, one of which is the angular rate input on line 13 and the other of which is a dither-rate input on line 15. Total input rate consists of the sum of the external angular rate and the dither rate. The gyro, in use, would be mounted, for example, in an aircraft. As the aircraft rotates about the axis of the gyro, for example, in heading, an angular rate input $\omega$ will occur. As noted above, because of lock-in which is present in the ring laser gyro, small rotations are not detectable. Thus a dither rate input causing an oscillation of the ring laser gyro is utilized. The signal for the dither rate is generated in a dither generator 17. In the prior art, a dither generator which operated in an open-loop mode was used. However, in accordance with the present invention, the dither generator is now a feedback generator obtaining an input from the gyro readout output on line 19.

In order to determine the nature of the function which the feedback dither generator 17 must provide, it is necessary to examine the gyro behavior. This behavior is represented by the following equation:

$$d\phi/dt = \omega + \omega_d - \omega_L \sin G(\phi + \beta) \quad (1)$$

where $\phi$ is the angle of the laser fringe pattern, i.e., the interference pattern between the two beams, relative to a reference point on the structure carrying the laser beams.

$\omega$ is the input angular velocity
$\omega_d$ is the dither angular velocity
$\omega_L$ is an angular rate corresponding to the lock-in frequency
G is the gyro scale factor
$\beta$ is a fixed angle.

The gyro output c is the difference between the angle $\phi$ and the dither angle $\phi_d$. That is $$c = \phi - \phi_d \quad (2)$$

where $$\dot{\phi}_d = \omega_d \quad (3)$$

The object of the present invention is to generate a dither signal $\omega_d$ that cancels the lock-in term $\omega_L \sin G(\phi + \beta)$. Ideally, this would require that the dither signal be given by $$\omega_d = \omega_L \sin G(\phi + \beta) = \omega_L \sin G(c + \phi_d + \beta) \quad (4)$$

Figure 2:
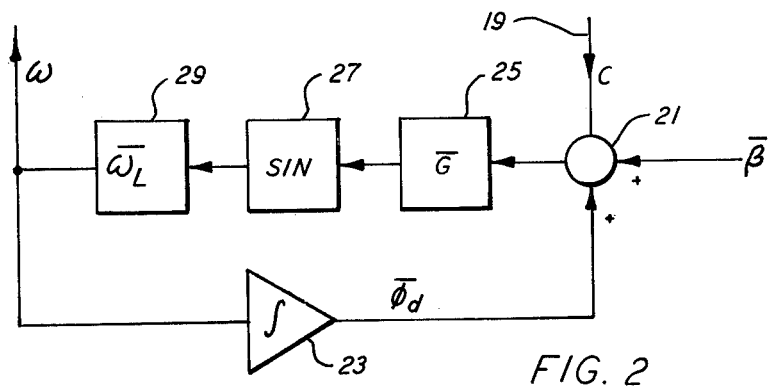
FIG. 2 is a conceptual block diagram of an implementation of the present invention.

The manner in which this is accomplished is illustrated by FIG. 2. The gyro output c on line 19 is provided to a summing junction 21 where it is summed with $\bar{\beta}$, the best available estimate of the fixed angle $\beta$, and with feedback from an integrator 23. The result of this sum which will be $c + \phi_d + \bar{\beta}$, is an input to a multiplier 25. Here it is multiplied by the gyro scale factor $\bar{G}$, the best available estimate of G. This multiplication can be carried out using an operational amplifier properly scaled. The summing junction 21 can be the summing junction at the input of the amplifier. This signal is then provided as an input to a non-linear function generator 27 which provides an output which is the sine of its input. Any of the various generators known in the art may be used. Thus, an operational amplifier function generator, a servo driven sine potentiometer, or a read-only memory arrangement with the analog signal out of the multiplier 25 converted to a digital signal, and provided as an input to the read-only memory, the output thereof then converted back to an analog signal, may be used. The result, which will be the sin $\overline{G}(c + \phi_d + \overline{\beta})$ is then multiplied by the quantity $\overline{\omega}_L$ in an additional multiplier 29, e.g. a scaled operational amplifier. The resulting output is $\omega_d$ of equation (4). This quantity is integrated in the integrator 23 to obtain $\phi_d$. This is necessary since the angle is not directly available, i.e., only the rate $\omega_d$ is available. Quantities which are not measured, but which are subject to uncertainty or may change, are designated on FIG. 2 with an over-bar. In designing the system, the best available estimate of these quantities is used.

The system of FIG. 2 does not take into account the fact that, in order to generate the dither angular velocity, it will generally be necessary to use a mechanical torquer. Thus, it is necessary to take into account the behavior of the torquer which is covered by the following differential equation:

$$(d\omega_d/dt) = -(1/T)\omega_d + u \quad (5)$$

where u is the angular acceleration and T is the torquer time constant. The angular acceleration being proportional to the electrical input to the torquer. The feedback system must generate $$u = (1/T)\omega_d + (d\omega_d/dt) = (\omega_L/T)\sin G(c + \phi_d + \beta) + (\dot{c}+\dot{\phi}_d)G\omega_L\cos G(c+\phi_d+\beta) \quad (6)$$

Figure 3:
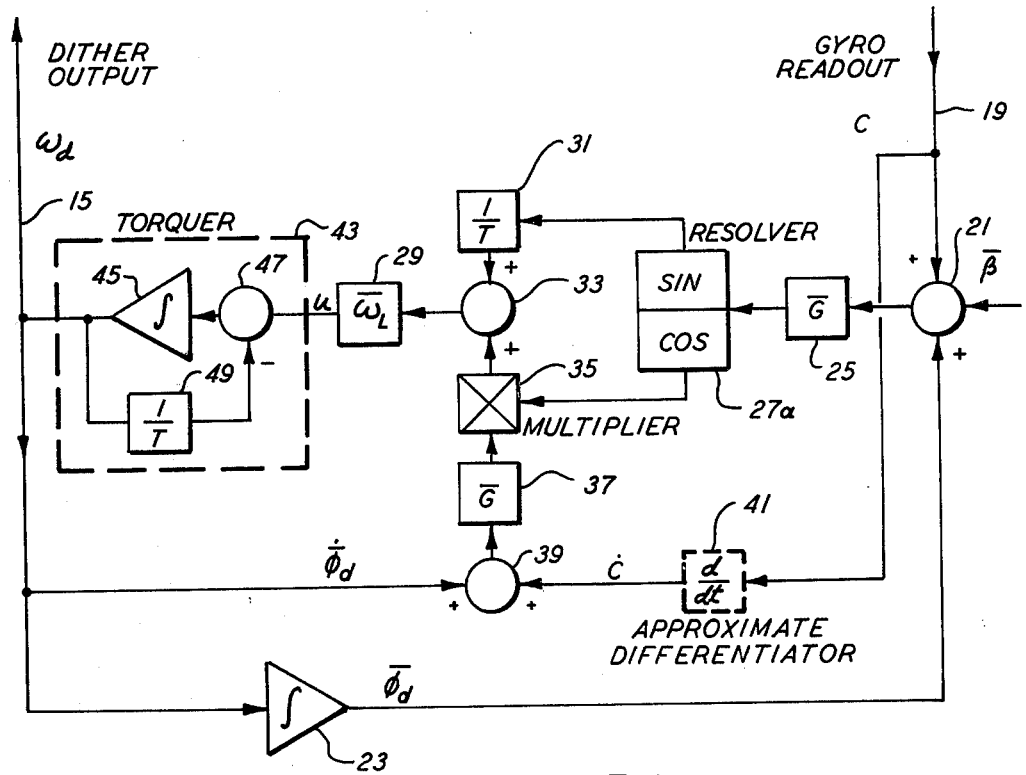
FIG. 3 is a more detailed schematic drawing of a practical embodiment of the present invention.

As can be seen from FIG. 2, all the required signals, except for $\dot{c}$ are present. This quantity can be generated using a differentiator. Thus, in order to implement a complete system having the characteristics of equation (6), the system of FIG. 3 may be used. On this Figure, portions which are identical to what was described in connection with FIG. 2 are given identical reference numerals. Thus, the gyro read-out c is provided on line 19 as an input to the summing junction 21 along with the quantity $\overline{\beta}$ and $\phi_d$ from the integrator 23. Once again, this quantity is multiplied by $\overline{G}$ in a multiplier 25, e.g. a scaled amplifier which may be constructed as described above. It is necessary that both the sine and cosine of this quantity be taken and thus, there is provided a sine-cosine function generator 27a, e.g., a resolver. Again, this can be implemented in any of the ways noted above in connection with FIG. 2. The sine output is provided as an input to a multiplier 31 where it is multiplied by the factor 1/T. Again, this multiplication can be carried out by proper scaling in an operational amplifier. The output of the multiplier 31 is to a summing junction 33. The cosine output of the sine-cosine function generator 27a is one input to an analog multiplier 35. It obtains its second input from a multiplier 37 which will be essentially identical to the multiplier 25, i.e., it can be implemented through proper scaling of an operational amplifier. The input of the multiplier 37 is from a summing junction 39 which may be the summing junction at the input of the scaled amplifier used to implement multiplier 37. The summing junction receives as inputs the quantity $\dot{\phi}_d$ (which is equal to $\omega_d$) and the quantity $\dot{c}$ which is obtained through an approximate differentiator 41 which may simply comprise a capacitive differentiator. If more accuracy is desired, an operational amplifier differentiator may be used.

The output of the multiplier 35 is the second input to the summing junction 33, the output of which is the input to the multiplier 29. Again, this summing junction may be the summing junction at the input thereof. The output of the multiplier 29 is the input to a torquer 43 which has the characteristic behavior represented by its equivalent circuit, i.e., it is represented by an integrator 45 having a summing junction 47 at its input where the output of the multiplier 29 is summed with feedback from the integrator output having a transfer function 1/T as indicated by block 49. The output of the torquer is the final output on line 15, i.e., the dither output.

Under ideal conditions, when the actual gyro parameters are equal to the best available estimates used in the design, the lock-in effect is entirely eliminated, i.e., there is no residual lock-in. Deviation of these parameters from their nominal values will cause some errors. However, because feedback is used, these errors will be much smaller than the errors present in the prior art open-loop dither technique.

It should be noted that, although the present invention has been disclosed in terms of an analog implementation, the feedback dither generator 17 of FIG. 1 could equally well be implemented digitally or in a hybrid analog digital system. Such becomes particularly attractive if a micro-processor is readily available. In such a case, it is only necessary that the readout quantity c on line 19 be converted to a digital value in an analog to digital converter and that value fed to the micro-processor. The micro-processor would then be programmed to solve the equations (4) or (6) with the output of the microprocessor then converted back into analog form through a digital to analog converter to provide the output signal on line 15.

I claim:

1. In combination with a ring laser gyro adapted to provide a gyro readout proportional to an angular input rate, an improved dither generator comprising a feedback dither generator having as an input the gyro readout and providing as an output a dither rate for dithering the gyro, said feedback dither generator adapted to generate a dither rate which is essentially equal to the lock-in characteristic of the gyro.

2. Apparatus according to claim 1 wherein the gyro behavior is represented by the differential equation $(d\phi/dt=\omega+\omega_d-\omega_L\sin G(\phi+\beta)$ where $\phi$ is the angle of the laser fringe pattern, i.e., the interference pattern between the two beams, relative to a reference point on the structure carrying the laser beams $\omega$ is the input angular velocity $\omega_d$ is the dither angular velocity $\omega_L$ is an angular rate corresponding to the lock-in frequency G is the gyro scale factor $\beta$ is a fixed angle and where the gyro output c is the difference between the angle $\phi$ and the dither angle $\phi_d$ where $\phi_d$ is equal to $\omega_d$ and wherein said feedback dither generator generates a dither rate $\omega_d$ which is equal to $\omega_L\sin G(c + \phi_d + \beta)$.

3. Apparatus according to claim 2 wherein a mechanical torquer is used to generate the dither angular velocity, the behavior of the mechanical torquer represented by $d\omega_d/dt = -(1/T)\omega_d + u$ where u is the angular acceleration and T is the torquer time constant, the angular acceleration being proportional to the electrical input to the torquer and wherein said feedback dither generator is adapted to generate the function $$u = (1/T)\omega_d + (d\omega_d/dt) = \omega_L/T \sin G(c + \phi_d + \beta) + (\dot{c}+\dot{\phi}_d)G\omega_L\cos G(c + \phi_d + \beta).$$

4. Apparatus according to claim 1 wherein said feedback dither generator comprises:
   (a) a summing junction having as a first input the gyro readout;
   (b) multiplying means having as an input the output of said summing junction for multiplying the input by a quantity proportional to the gyro scale factor;
   (c) a sine function generator having as an input the output of the said first multiplying means and providing an output proportional to the sine of its input;
   (d) a second multiplying means having the output of said sine generator as an input for multiplying said input by the angular rate corresponding to the lock-in frequency and providing as its output the dither rate; and
   (e) an integrator having said dither rate output as an input and providing its output as a second input to said summing junction.

5. Apparatus according to claim 4 wherein said multiplying means comprise scaled amplifiers and wherein said summing junction is formed at the input of said first multiplying means.

6. Apparatus according to claim 1 wherein a mechanical torquer is used to generate the dither angle velocity and wherein said feedback dither generator comprises:
   (a) a first summing junction having as a first input the gyro readout and as a second input a quantity proportional to a fixed predetermined angle;
   (b) first multiplying means having as an input the output of said summing junction for multiplying said input by a quantity proportional to the gyro scale factor;
   (c) a sine-cosine function generator having as an input the output of said first multiplying means and providing as outputs the sine and cosine thereof respectively;
   (d) second multiplying means having as an input the sine output of said sine-cosine generator for multiplying said input by the quantity 1/T where T is the torquer time constant;
   (e) third multiplying means having as a first input cosine output of said sine-cosine generator;
   (f) a second summing junction having as inputs the outputs of said second and third multipliers;
   (g) fourth multiplying means having as an input the output of said second summing junction for multiplying its input by the quantity $\phi_L$ where $\phi_L$ is an angular rate corresponding to the lock-in frequency, the output of said fourth multiplying means providing an input to the torquer, the torquer output in turn being the dither output;
   (h) a differentiator having as an input the gyro readout and providing an output proportional to the differential thereof;
   (i) a third summing junction having as inputs the output of said torquer and the output of said differentiator;
   (j) fifth multiplying means having as an input the output of said third summing junction and providing its output as a second input to said third multiplying means, said fifth multiplying means multiplying its input by a quantity proportional to the gyro scale factor; and
   (l) an integrator having as an input the output of said torquer and providing its input as a third input to said first summing junction.

7. Apparatus according to claim 6 wherein said first, second, fourth and fifth multiplying means comprise scaled operational amplifiers and wherein said first summing junction is a summing junction at the input of said first multiplying means, said second summing junction is a summing junction at the input of said fourth multiplying means and said third summing junction is a summing junction at the input of said fifth multiplying means.

8. An improved method of controlling dither for a ring laser gyro adapted to provide a gyro readout proportional to an angular input rate, comprising generating dither rate using a feedback loop having as an input the gyro readout and providing as an output a dither rate for dithering the gyro, said dither rate being essentially equal to the lock-in characteristic of the gyro.

9. The method according to claim 8 wherein the gyro behavior is represented by the differential equation $$d\omega/dt = \omega + \omega_d - \omega_L \sin G(\phi+\beta)$$

where
   $\phi$ is the angle of the laser fringe pattern, i.e., the interference pattern between the two beams relative to a reference point on the structure carrying the laser beams
   $\omega$ is the input angular velocity
   $\omega_d$ is the dither angular velocity
   $\omega_L$ is an angular rate corresponding to the lock-in frequency
   G is the gyro scale factor
   $\beta$ is a fixed angle
and where the gyro output c is the difference between the angle $\phi$ and the dither angle $\phi_d$ where $\phi_d$ is equal to $\omega_d$ and wherein a dither rate $\omega_d$ which is equal to $\omega_L \sin G(c + \phi_d + \beta)$ is generated.

10. The method according to claim 9 wherein a mechanical torquer is used to generate the dither angular velocity, the behavior of the mechanical torquer represented by $d\omega_d/dt = -(1/T)\omega_d + u$ where u is the angular acceleration and T is the torquer time constant, the angular acceleration being proportional to the electrical input to the torquer and wherein said step of generating comprises generating the function:

$$u = (1/T)\omega_d + (d\omega_d/dt) = (\omega_L/T) \sin G(c + \phi_d + \beta) + (\dot{c} + \dot{\phi}_d)G\omega_L\cos G(c + \phi_d +\beta)$$

11. The method according to claim 8 wherein said dither rate is generated by steps comprising:
   (a) summing, in summing means, the gyro readout, a fixed angle, and the dither angle to obtain a sum;
   (b) multiplying, in multiplying means, said sum by a quantity proportional to the gyro scale factor to obtain a first product;
   (c) finding the sine of said product in a sine function generator;
   (d) multiplying said first product, in multiplying means by the angular rate corresponding to the lock-in frequency to provide a second product equal to the dither rate;

(e) feeding said second product as the dither rate input to the gyro; and (f) integrating said second product in an integrator to obtain said dither angle.

12. The method according to claim 8 wherein a mechanical torquer is used to generate the dither angle velocity and wherein said steps of generating a dither rate comprise:

(a) summing, in summing means, the gyro readout, a quantity proportional to a fixed predetermined angle and the dither angle to obtain a first sum;

(b) multiplying, in multiplying means, said first sum by a quantity proportional to the gyro scale factor to obtain a first product;

(c) determining, in a sine-cosine function generator the sine and cosine of said first product;

(d) multiplying, in multiplying means, said sine by the quantity 1/T where T is the torquer time constant to obtain a second product;

(e) differentiating in a differentiator the gyro readout;

(f) summing the differential of the gyro rate with the dither rate in summing means to obtain a second sum;

(g) multiplying said second sum by the gyro scale factor in multiplying means to obtain a third product;

(h) multiplying said third product by said cosine in multiplying means to obtain a fourth product;

(i) summing in summing means said second and fourth products to obtain a third sum;

(j) multiplying, in multiplying means, said third sum by an angular rate corresponding to the lock-in frequency to obtain a fifth product;

(k) coupling said fifth product as an input to the torquer, the torquer output in turn being the dither output; and (l) integrating, in an integrator, said fifth product to obtain said dither angle.

* * * * *